United States Patent
Ketels et al.

(10) Patent No.: US 11,585,128 B2
(45) Date of Patent: Feb. 21, 2023

(54) ACTUATOR FOR A VEHICLE COMPARTMENT

(71) Applicant: Faurecia Interior Systems, Inc., Auburn Hills, MI (US)

(72) Inventors: Cedric Ketels, Auburn Hills, MI (US); Ryan Clark, Sunnyvale, CA (US); Bruno Dinant, Saint-Brice-sous-Forêt (FR); Jean-Michel Azevedo, Santa Clara, CA (US); Julien Rea, Sunnyvale, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 884 days.

(21) Appl. No.: 16/425,239

(22) Filed: May 29, 2019

(65) Prior Publication Data

US 2020/0378162 A1  Dec. 3, 2020

(51) Int. Cl.
| | |
|---|---|
| *B60R 7/06* | (2006.01) |
| *E05B 83/30* | (2014.01) |
| *E05B 81/56* | (2014.01) |
| *E05B 51/00* | (2006.01) |
| *E05F 1/08* | (2006.01) |
| *E05B 81/04* | (2014.01) |
| *E05B 47/00* | (2006.01) |

(52) U.S. Cl.
CPC ............... *E05B 83/30* (2013.01); *B60R 7/06* (2013.01); *E05B 51/005* (2013.01); *E05B 81/04* (2013.01); *E05B 81/56* (2013.01); *E05F 1/08* (2013.01); *E05B 47/0009* (2013.01); *E05Y 2900/538* (2013.01)

(58) Field of Classification Search
CPC ........ E05B 83/30; E05B 51/005; E05B 81/04; E05B 81/56; E05B 47/0009; E05B 81/16; B60R 7/06; B60R 7/04; E05F 1/08; E05Y 2900/538; E05C 9/043
USPC ...................................................... 296/24.34
See application file for complete search history.

(56) References Cited

U.S. PATENT DOCUMENTS

| | | | |
|---|---|---|---|
| 3,873,881 | A | 3/1975 | Inoue |
| 4,806,815 | A | 2/1989 | Honma |
| 5,531,086 | A | 7/1996 | Bryant |
| 6,192,723 | B1 | 2/2001 | Brownell, Sr. |
| 6,574,958 | B1 | 6/2003 | MacGregor |
| 7,364,211 | B2 | 4/2008 | Niskanen |
| 7,380,843 | B2 | 6/2008 | Alacqua |
| 7,500,704 | B2 | 3/2009 | Herrera |

(Continued)

FOREIGN PATENT DOCUMENTS

| | | |
|---|---|---|
| CN | 102170765 A | 8/2011 |
| DE | 10349032 | 5/2005 |

(Continued)

OTHER PUBLICATIONS

Office Action dated May 1, 2020 for U.S. Appl. No. 16/020,194 (pp. 1-7).

(Continued)

*Primary Examiner* — Pinel E Romain
(74) *Attorney, Agent, or Firm* — Barnes & Thornburg LLP

(57) ABSTRACT

A vehicle includes a compartment mounted to a frame of the vehicle. The compartment includes a box coupled to the frame in a fixed position relative to the frame and a latch system coupled to the box to allow a user to access the box. The latch system includes a shape-memory alloy wire guided by a pulley during actuation of the latch system.

19 Claims, 5 Drawing Sheets

(56) References Cited

U.S. PATENT DOCUMENTS

| | | |
|---|---|---|
| 7,555,900 B1 | 7/2009 | Vallance |
| 7,764,159 B2 | 7/2010 | Zanella |
| 7,766,409 B2 | 8/2010 | Ohnuki |
| 7,832,239 B2 | 11/2010 | Akihiko |
| 7,878,035 B2 | 2/2011 | Yamaguchi |
| 8,393,652 B2 | 3/2013 | Szilagyi |
| 8,443,600 B2 | 5/2013 | Butera |
| 8,505,987 B2 | 8/2013 | Browne |
| 8,596,704 B2 | 12/2013 | Sielhorst |
| 8,706,305 B2 | 4/2014 | Jiang |
| 8,756,933 B2 | 6/2014 | Topliss |
| 8,915,524 B2 | 12/2014 | Charnesky |
| 9,316,031 B2 | 4/2016 | Abe |
| 10,364,593 B2 | 7/2019 | Alexander |
| 2005/0023086 A1 | 2/2005 | Szilagyi |
| 2005/0184533 A1 | 8/2005 | Hebenstreit |
| 2007/0175213 A1 | 8/2007 | Featherstone |
| 2008/0007081 A1 | 1/2008 | Shibata |
| 2008/0022674 A1 | 1/2008 | Brown |
| 2008/0100079 A1 | 5/2008 | Herrera |
| 2008/0271559 A1 | 11/2008 | Garscha |
| 2009/0301077 A1 | 12/2009 | Takahashi |
| 2010/0071424 A1 | 3/2010 | Tsuruta |
| 2012/0187128 A1 | 7/2012 | Weber |
| 2013/0043691 A1 | 2/2013 | Marz |
| 2013/0305705 A1 | 11/2013 | Ac |
| 2014/0210219 A1 | 7/2014 | Pipp |
| 2015/0300055 A1 | 10/2015 | Alexander |
| 2017/0058577 A1 | 3/2017 | Ben Abdelaziz |
| 2018/0106079 A1 | 4/2018 | Alacqua |
| 2018/0371795 A1 | 12/2018 | Nakasone |
| 2019/0234120 A1 | 8/2019 | Flaute |
| 2020/0002978 A1 | 1/2020 | Ketels |
| 2020/0002979 A1 | 1/2020 | Ketels |
| 2020/0002980 A1 | 1/2020 | Ketels |
| 2020/0040609 A1 | 2/2020 | Alexander |

FOREIGN PATENT DOCUMENTS

| | | |
|---|---|---|
| DE | 102010009690 A1 | 12/2010 |
| DE | 102010030645 A1 | 7/2011 |
| DE | 102010030645 B4 | 7/2011 |
| DE | 102012000913 A1 | 7/2013 |
| FR | 2655598 | 6/1991 |
| FR | 3021686 A1 | 12/2015 |
| KR | 20050069284 | 7/2005 |
| KR | 20150032168 | 3/2015 |
| WO | 02073033 A1 | 9/2002 |
| WO | 2013105387 A1 | 7/2013 |
| WO | 2015150051 A1 | 10/2015 |
| WO | 2016185973 A1 | 11/2016 |

OTHER PUBLICATIONS

Office Action (Non-Final Rejection) dated Apr. 25, 2022 for U.S. Appl. No. 16/834,169 (pp. 1-21).

German Search Report for German Patent App No. 10 2021 107 652.8 dated Jan. 17, 2022, 8 pages, No English Translation Available.

Badescu et al., Compact, Low-Force, Low-Noise Linear Actuator, Tech Briefs, Oct. 1, 2012, available at https://www.techbriefs.com/component/content/article/tb/techbriefs/mechanics-and-machinery/14923, 3 pages.

Office Action dated Jan. 10, 2020 for U.S. Appl. No. 16/020,201, IDFAUH18047 US-U II (pp. 1-8).

Office Action dated Jan. 16, 2020 for U.S. Appl. No. 16/020,201, IDFAUH18047 US-U II (pp. 1-8).

Office Action dated Jul. 10, 2019 for U.S. Appl. No. 16/020,187 (pp. 1-6).

Office Action dated Nov. 12, 2019 for U.S. Appl. No. 16/020,194 (pp. 1-6).

Office Action dated Dec. 2, 2019 for U.S. Appl. No. 16/020,187 (pp. 1-5).

ACTUATOR FOR A VEHICLE COMPARTMENT

BACKGROUND

The present disclosure relates to actuators for a compartment, and particularly to actuators adapted for use with vehicle components. More particularly, the present disclosure relates to actuators for use with glovebox compartments.

SUMMARY

According to the present disclosure, a vehicle includes a glove compartment mounted to a frame of the vehicle. The glove compartment includes a glove box coupled to a vehicle in a fixed position relative to the vehicle and a latch system coupled to the glove box to allow a user access to the glove box. The glove box includes a container formed to include an aperture arranged to open into a space formed in the container and a lid coupled to the container to move relative to the container between a closed position and an open position.

In illustrative embodiments, the latch system includes a latch configured to change the lid from the closed position to the open position and an actuator coupled to the latch and configured to cause the latch to change the lid from the closed position to the open position in response to an input from a user. In illustrative embodiments, the actuator includes a housing coupled to the container, a transmission mover coupled to the housing to move relative to the housing and engaged with the latch to move the latch, and a control system coupled to the transmission mover and configured to apply power to the transmission mover to cause the transmission mover to change between positions along a lateral axis of the housing in response to receipt of the input to the control system.

In the illustrative embodiments, the transmission mover includes an actuator arm coupled to the housing and extending to the latch, a plurality of shape-memory alloy wires coupled to the actuator arm and configured to move the actuator arm along the lateral axis in response to changes in length of the plurality of shape-memory alloy wires upon receipt of the input from the control system.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
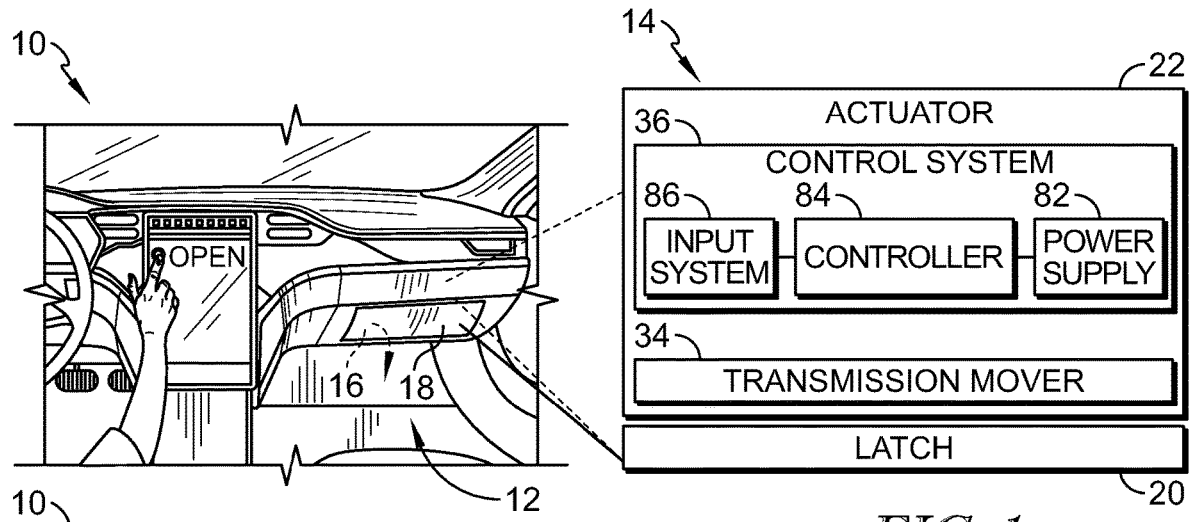
FIG. 1 is a perspective and diagrammatic view of a glove compartment in accordance with the present disclosure showing that the glove compartment includes a glove box and a latch system coupled to the glove box and to allow the glove box to change between a close position and an open position in response to an input provided by a control system.
Figure 2:
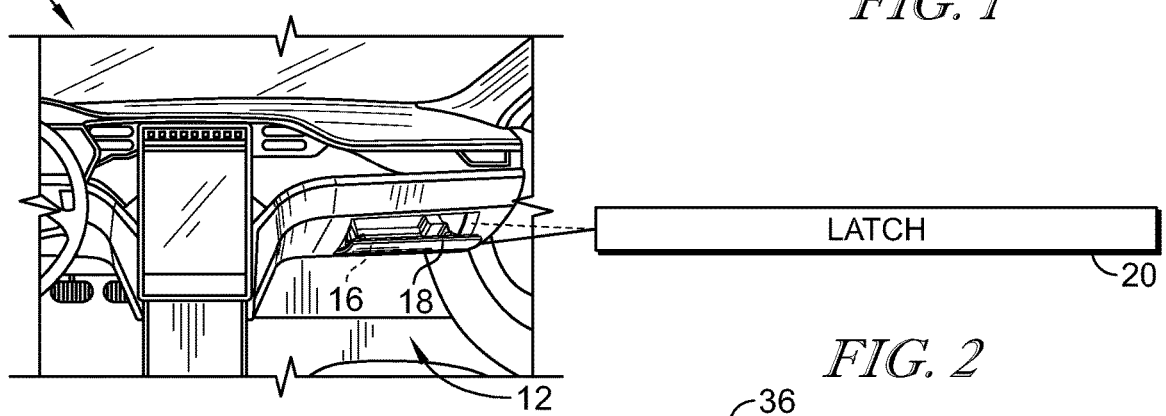
FIG. 2 is a view similar to FIG. 1 in which the latch system has been engaged to cause the glove box to move to the open position in response to receipt of the input provided by the user.
Figure 3:
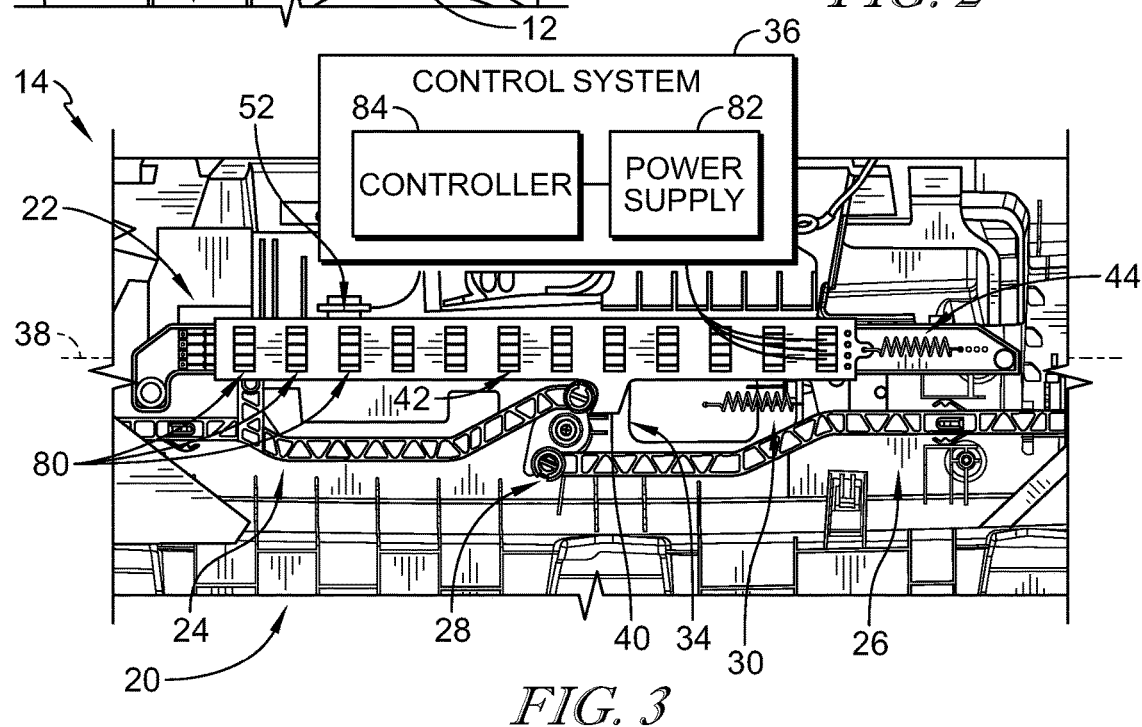
Figure 4:
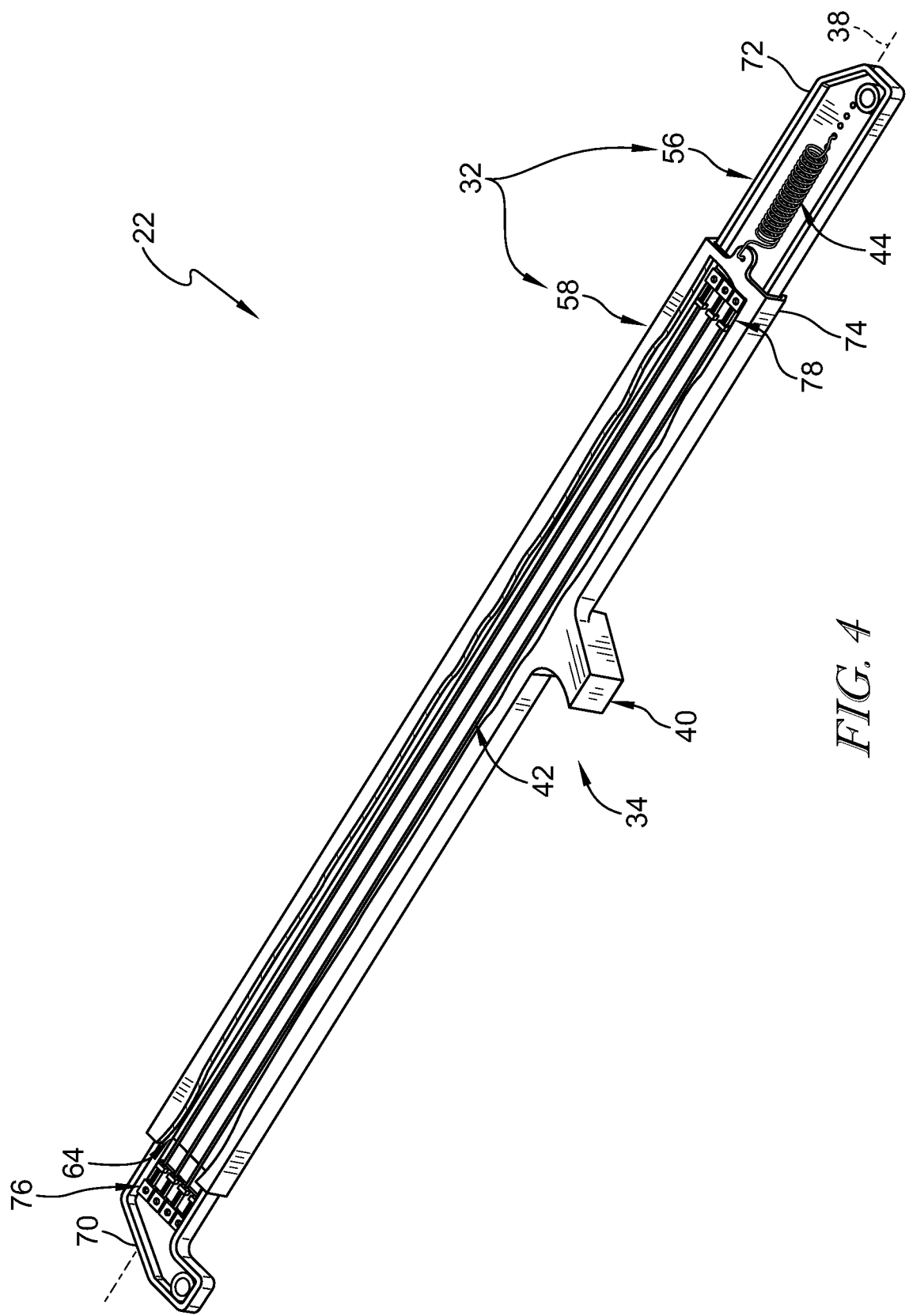
Figure 5:
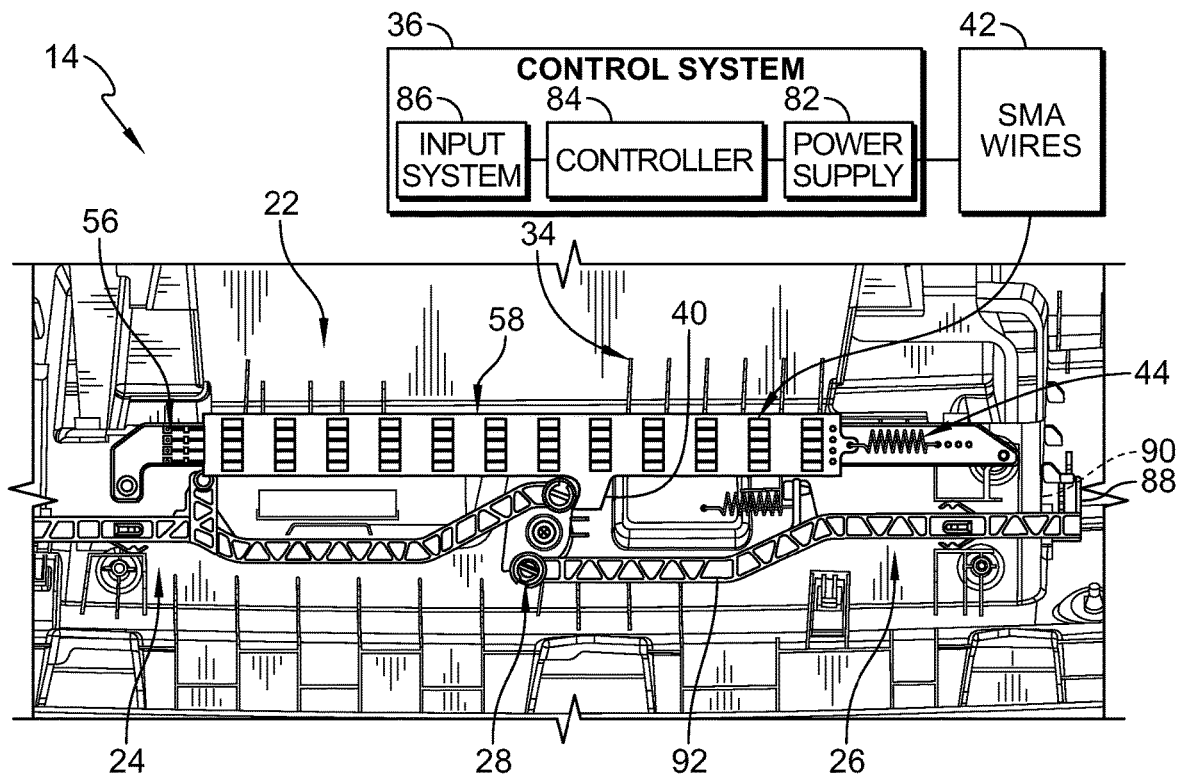
Figure 6:
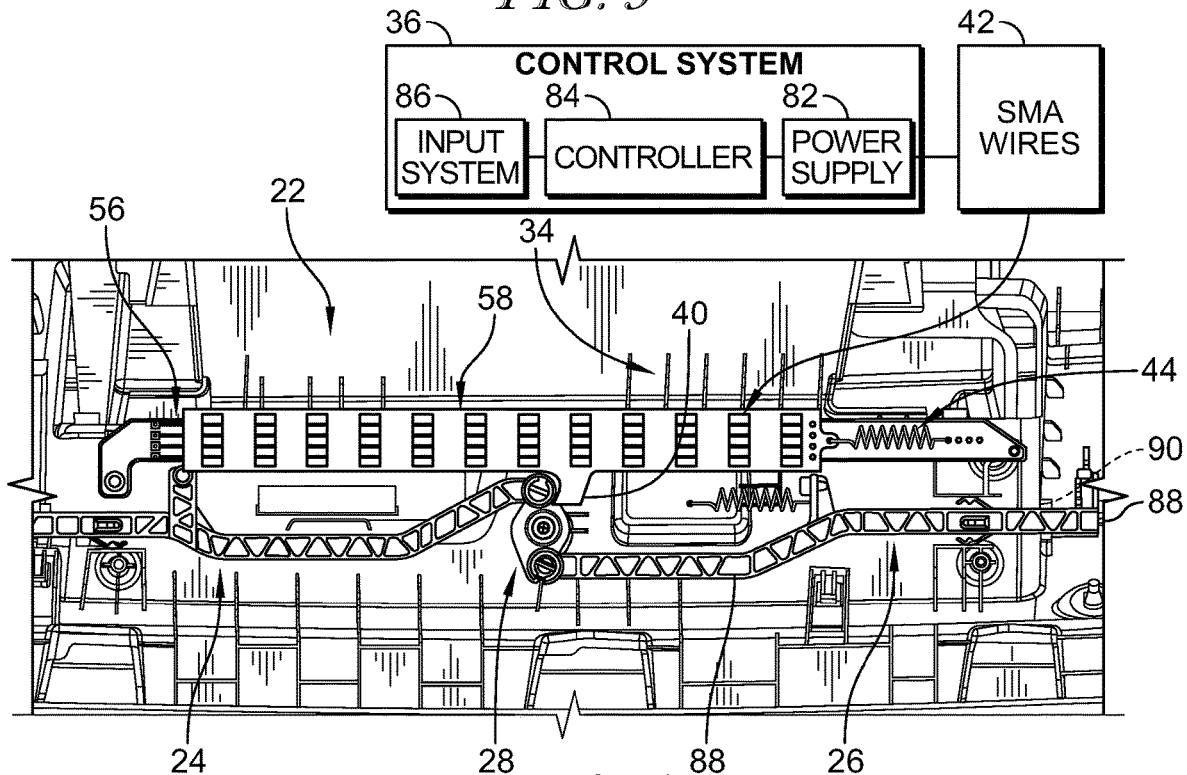
Figures 7, 8:
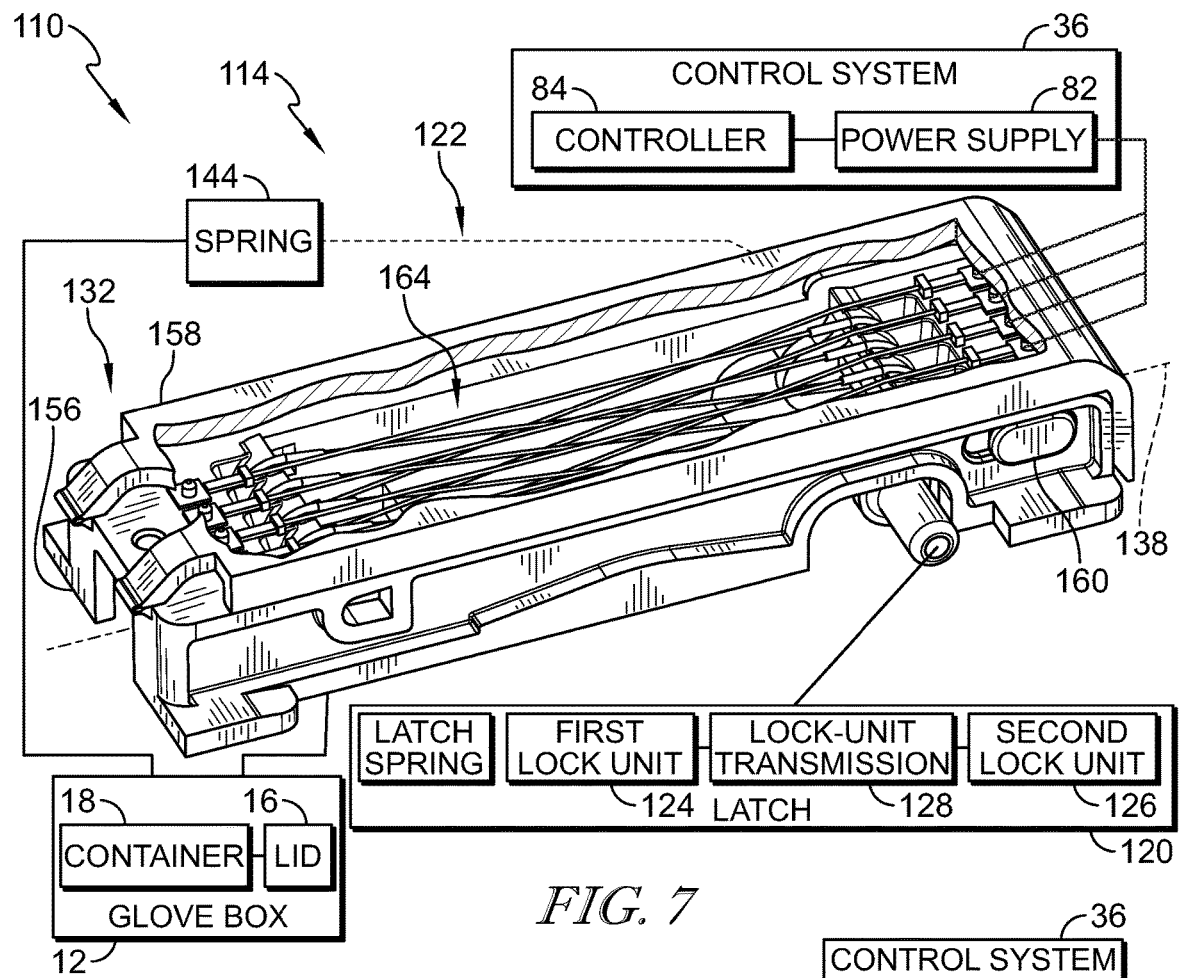
Figure 9:
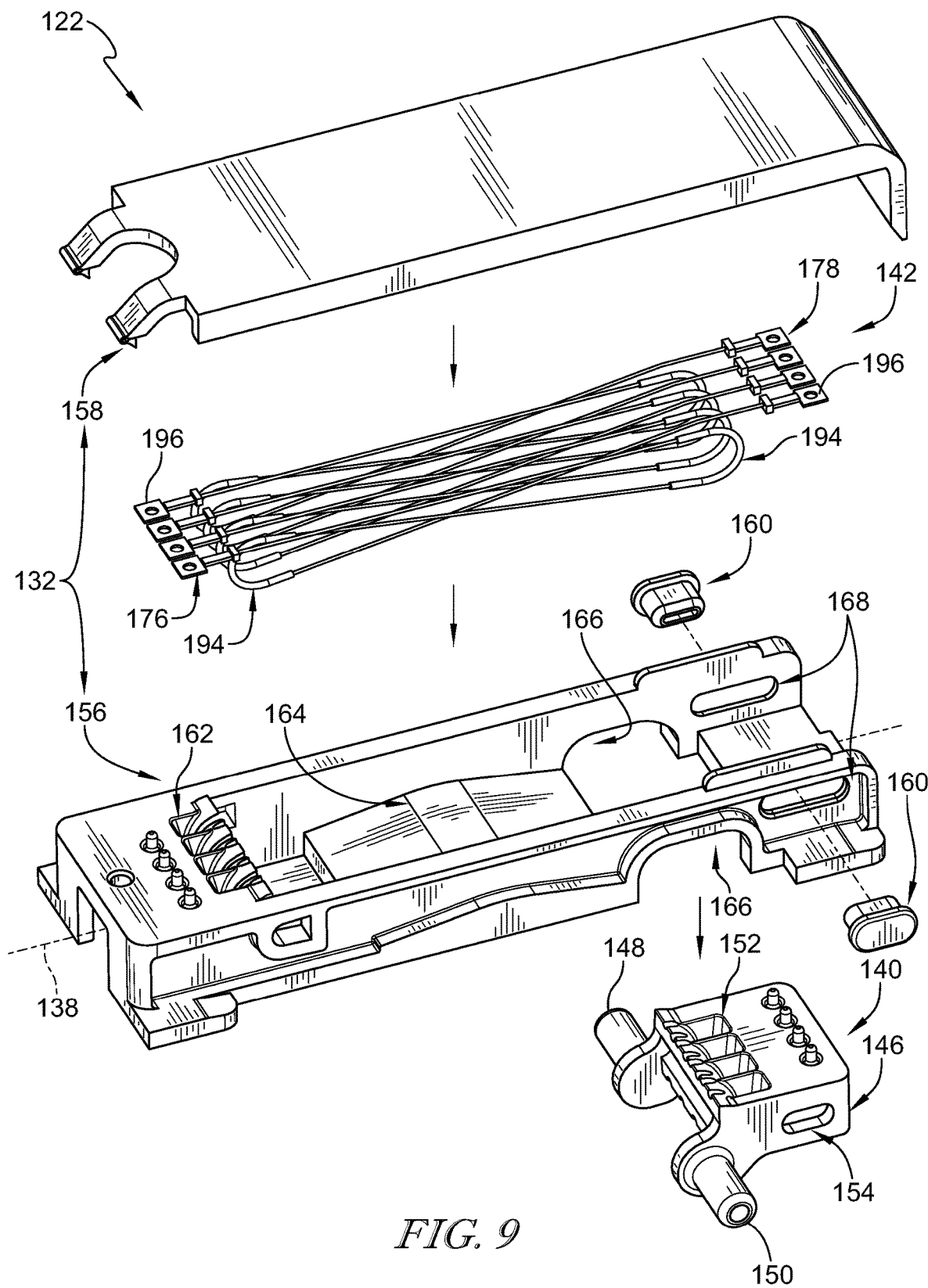

FIG. 3 is a partial plan view and diagrammatic view of the glove box in FIGS. 1 and 2 showing the latch system including a latch and an actuator coupled to the latch and configured to move the latch from a first position to a second position, the actuator including a housing and a transmission mover coupled to the housing to move relative to the housing and engaged with the latch to cause the latch to move between the first and second positions in response to the input from the user;

FIG. 4 is a perspective view of the actuator in FIG. 3 showing the transmission mover including an actuator arm coupled to the housing and a plurality of shape-memory alloy wires coupled to the actuator arm and configured to move the actuator arm along the lateral axis in response to changes in length of the plurality of shape-memory alloy wires between a first length as shown in FIG. 5 and a relatively smaller second length as shown in FIG. 6;

FIG. 5 is a partial plan view and diagrammatic view of the glove box showing the plurality of shape-memory allow wires at the first length causing the latch to the be in the first position;

FIG. 6 is a view similar to FIG. 5 showing the plurality of shape-memory allow wires have changed from the first length to the second length causing the latch to move from the first position to the second position to cause the glove box to be in the open position;

FIG. 7 is a perspective and diagrammatic view of a second embodiment of the latch system including a latch and an actuator coupled to the latch to move the latch from the first position to the second position, the actuator including a housing and a transmission mover coupled to the housing to move relative to the housing and engaged with the latch to cause the latch to move between the first and second positions in response to the input from the user;

FIG. 8 is a top view of the latch system of FIG. 7 showing the housing including a foundation and a cover coupled to the foundation to define an interior space between the foundation and the cover and showing a portion of the cover broken away to show the transmission mover arranged in the interior space between the foundation and the cover, the transmission mover including an actuator arm arranged to extend through a portion of the foundation and a plurality of shape-memory alloy wires coupled to the actuator arm and configured to move the actuator arm along the lateral axis in response to changes in length of the plurality of shape-memory alloy wires between a first length and a relatively smaller second length; and FIG. 9 is an exploded view of the actuator of FIG. 8 showing the actuator arm includes an actuator arm body slidable relative to the stationary housing foundation within the interior space along the lateral axis of the stationary foundation, a first actuator arm peg that extends from the actuator arm body outside of the interior space of the housing to engage the latch, and a second actuator arm peg that extends from the actuator arm body opposite the first actuator arm peg outside of the interior space of the housing.

DETAILED DESCRIPTION

A first embodiment of a glove compartment 10 is shown in FIGS. 1-6. The glove compartment 10 includes a glove box 12 and a latch system 14 configured to receive inputs from a user to cause the glove box 12 to change between a closed position shown in FIGS. 1 and 5 and an open position shown in FIGS. 2 and 6. A second embodiment of a glove compartment 110 is shown in FIGS. 7-9.

A glove compartment 10 includes a glove box 12 and a latch system 14 as shown in FIGS. 1-3. The glove box 12 is adapted to be coupled to a vehicle in a fixed position relative to the vehicle. The latch system 14 is coupled to the glove box 12 and is configured to allow a user access to the glove box 12.

The glove box 12 includes a container 16 and a lid 18 as shown in FIGS. 1 and 2. The container 16 is formed to include an aperture arranged to open into a space formed in the container 16. The lid 18 is coupled to the container 16 and moves relative to the container 16 between a closed position as shown in FIGS. 1 and 5 and an open position as shown in FIGS. 2 and 6.

The latch system 14 includes a latch 20 and an actuator 22 as shown in FIGS. 4-6. The latch 20 is configured to allow the lid 18 to move between the closed position and the open position. The lid 18 is in the closed position when the lid 18 closes the aperture and blocks access to the space. The lid is in the open position when the lid 18 has moved away from the container 16 to allow access to the space through the aperture. The actuator 22 is engaged with the latch 20 and is configured to cause the latch to move the latch 20.

The latch 20 includes first and second lock-units 24, 26, a lock-unit transmission 28, and a latch spring 30 as shown in FIGS. 5 and 6. The first lock-unit 24 unit is coupled to the container 16 to move relative to the container 16. The second lock-unit 26 unit is coupled to the container 16 to move relative to the container 16. The lock-unit transmission 28 is arranged to extend between and interconnect the first lock-unit 24 and the second lock-unit 26 to cause movement of the first lock-unit 24 to be transmitted to the second lock-unit 26. The first lock-unit 24 and the second lock-unit 26 move away from one another when the latch 20 is in the unlocked configuration and move toward one another when the latch 20 is in the locked configuration. The latch spring 30 is arranged to extend between and interconnect the container 16 and the latch 20.

The first and second lock units 24, 26 are moveable between a first position in which movement of the lid 18 relative to the container 16 is blocked when the lid 18 is in the closed position and a second position in which movement of the lid 18 away from the container 16 is permitted. The latch spring 30 is configured to provide a latch bias force to the latch 20 to urge the latch 20 in the second direction to cause the latch 20 to move toward the first position.

The actuator 22 includes a housing 32, a transmission mover 34, and control system 36 as shown in FIGS. 3-6. The housing 32 is coupled to the container 16. The transmission mover 34 is coupled to the housing 32 to move relative to the housing 32 and is engaged with the lock-unit transmission 28 to cause the lock-unit transmission 28 to move between the first position and the second position. The control system 36 is coupled to the transmission mover 34 and is configured to apply power to the transmission mover 34 to cause the transmission mover 34 to change between a first mover position as shown in FIG. 5 and a second mover position as shown in FIG. 6 along a lateral axis 38 of the housing 32 in response to receipt of the input to the control system 36.

The transmission mover 34 includes an actuator arm 40, a plurality of shape-memory alloy wires 42, and an actuator spring 44 as shown in FIGS. 3-6. The actuator arm 40 is coupled to the housing 32 in a fixed position relative to the housing 32 and is arranged to extend toward the lock-unit transmission 28 to engage the lock-unit transmission 28. The plurality of shape-memory alloy wires 42 are coupled to the actuator arm 40 and are configured to move the actuator arm 40 along the lateral axis 38 in response to changes in length of the plurality of shape-memory alloy wires 42 between a first length as shown in FIG. 5 and a relatively smaller second length as shown in FIG. 6. The actuator spring 44 is arranged to extend between and interconnect the container 16 and the actuator arm 40.

The first length of the wires 42 is associated with the first mover position. The second length of the wires 42 is associated with the second mover position. Each shape-memory alloy wire 42 changes between the first and second lengths in response to the receipt of power supplied from the control system 36.

The actuator arm 40 moves in a first direction along the lateral axis 38 from the first mover position to the second mover position when the plurality of shape-memory alloy wires 42 change from the first length to the second length. The actuator spring 44 is configured to provide an actuator bias force to the actuator arm 40 to urge the actuator arm 40 in a second direction opposite the first direction to cause the transmission mover 34 to move toward the first mover position. In the illustrative embodiment, the actuator bias force is about 4.5 Newtons.

In some embodiments, the plurality of shape-memory alloy wires 42 include at least three shape-memory alloy wires 42 as shown in FIGS. 3-6. In the illustrative embodiment, the plurality of shape-memory allow wires 42 includes four shape-memory allow wires 42.

The more shape-memory alloy wires 42 included the in the plurality of shape-memory alloys wires 42 the greater the force applied to the latch 20 when the control system 36 supplies power to the wires 42. In the illustrative embodiment, the plurality of shape-memory wires 42 applies a force of about 25 Newtons to the actuator arm 40 to overcome the actuator bias force and move the actuator arm 40 from the first position to the second position. In some embodiments, the number of shape-memory alloy wires 42 may be reduced, while the thickness of the wires 42 may be increased to achieve the desired forced needed to open the glovebox 12. The thicker the wire 42 the greater the strength, however the cooling time of the wires 42 increases.

The needed force applied by the plurality of shape-memory alloy wires 42 needs to be greater than the force used to open the glovebox 12. The force used to open the glovebox 12 includes the actuator bias force of about 4.5 Newtons and the opening force of the glovebox, which may be in a range of between 12 Newtons to 20 Newtons.

In the illustrative embodiments, once power is supplied from the control system 36 to the plurality of shape-memory alloy wires 42, the lid 18 of the glovebox 12 opens after the dual lock-units 24, 26 are moved from the first position to the second position. The instant the lid 18 of the glovebox 12 opens, power is no longer supplied to the wires 42 and the plurality of shape-memory alloy wires 42 begin to cool and return to the original first length. The actuator spring 44 supports the return of the plurality of shape-memory alloys wires 42 from the second length to the first length. As such, the plurality of shape memory-alloy wires 42 are also configured to withstand such repeated opening and closing of the lid 18 of the glovebox 12.

The housing 32 includes a stationary housing foundation 56 and a moveable cover 58 as shown in FIGS. 3-6. The foundation 56 is coupled to the container 16 in a fixed position relative to the container 16. The movable cover 58 is coupled to the stationary housing foundation 56 to define an interior space 64 between the foundation 56 and the movable cover 58.

The moveable cover 58 is moveable relative to the stationary housing foundation 56 along the lateral axis 38 of the stationary foundation 56 between a first housing position as shown in FIG. 5 and a second housing position as shown in FIG. 6.

The first housing position is associated with the first mover position. The second housing position associated with the second mover position. In the illustrative embodiment, the actuator arm 40 extends from the moveable cover 58 to engage the lock-unit transmission 28 of the latch 20 to move the latch 20 between the first position and the second positions.

In the illustrative embodiment, the plurality of shape-memory alloy wires 42 are coupled to the stationary housing foundation 56 and the moveable cover 58 within the interior space 64 of the housing 32. The plurality of shape-memory alloy wires 42 are coupled to the foundation 56 and the cover 58 to cause the moveable cover 58 to move in the first direction from the first housing position to the second housing position in response to the receipt of the input to the control system 36.

In the illustrative embodiment, the stationary housing foundation 56 includes a first foundation end 70 and a second foundation end 72 as shown in FIG. 4. The second foundation end 72 is spaced apart from the first foundation end along the lateral axis 38. The first foundation end 70 and the second foundation end 72 are each coupled to the container 16 using a suitable fastener.

In the illustrative embodiment, the moveable cover 58 includes a first cover end 74 as shown in FIG. 4. The first cover end 74 is located in spaced-apart relation to the first foundation end 70 of the stationary housing foundation 56 along the lateral axis 38. The first cover end 74 is arranged between the first foundation end 70 and the second foundation end 72 along the lateral axis 38.

Each wire of the plurality of shape-memory alloy wires 42 includes a first end 76 and a second end 78 as shown in FIG. 4. The first end 76 is coupled to the first foundation end 70 of the stationary housing foundation 56. The second end 78 is coupled to the first cover end 74 of the moveable cover 58.

In the illustrative embodiment, the actuator spring 44 is coupled to the first cover end 74 and the second foundation end 72. In some embodiments, the actuator spring 44 may be coupled between other portions of the stationary foundation 56 and the moveable cover 58.

In the illustrative embodiment, the moveable cover 58 is formed to include a plurality of openings 80 as shown in FIG. 3. The openings 80 are spaced apart from one another along a length of the movable cover 58 relative to the lateral axis 38. The openings 80 allow air flow to the plurality of shape-memory alloy wires 42 to cool the plurality of shape-memory alloy wires 42. Such an airfoil may come from closing the lid 18 of the glove box 12.

The control system 36 includes a power supply 82, a controller 84, and an input system 86 as shown in FIGS. 1 and 2. The power supply 82 is coupled to the control system 36 and each shape-memory alloy wire 42. The power supply 82 is configured to provide power/current to the shape-memory alloy wires 42 to change the shape memory alloy wires from the first length to the second length. The controller 84 is coupled to the power supply 82 and the input system 86 and is configured to provide power to the shape-memory alloy wires 42 in response to the input being provided from the user.

In the illustrative embodiments, the power supply 82 supplies a current of about 410 milliamps to the wires 42 to heat the wires 42. Each wire 42 retracts about 3 percent to about 5 percent of the first length, about 10 millimeters. In the illustrative embodiment, the first length is about 217 millimeters.

The input from the user causes the controller 84 to provide power/current from the power supply 82 to the wires 44. The wires 44 change from the first length to the relatively smaller second length in milliseconds. Once the user stops providing the input, the controller 84 is configured to stop or cut the power from the power supply 82 to the wires 44. The wires 44 then return to the first length in about 5 seconds.

In one example, the input system 86 may include a button coupled to the control system 36 and is configured to provide the input in response to engagement of the button. In another example, the input system 86 may also include a touch screen coupled to the control system 36 and configured to provide the input in response to engagement of the touch screen. The input system may further include a remote device. The remote device is coupled to the control system 36 and is configured to provide the input in response to engagement of the remote device.

In the illustrative embodiment, the first lock-unit 24 and second lock-unit 26 each include a lock tab 88, a lock-tab receiver 90, and a tab-mover arm 92 as shown in FIG. 3. The lock tab 88 is movable between a first lock-tab position as shown in FIG. 6 and a second lock-tab position as shown in FIG. 7. The lock tab 88 is in the first lock-tab position when movement of the lid 18 relative to the container 16 is blocked. The lock tab 88 is in the second lock-tab position when movement of the lid 18 away from the container 16 is permitted. The lock-tab receiver 90 is configured to receive the lock tab 88 therein when the lock tab 88 is in the first lock-tab position and the lid 18 is in the closed position. The tab-mover arm 92 is coupled to the lock tab 88 to move therewith.

In the illustrative embodiment, the actuator 22 is engaged with the lock-unit transmission 28 and is configured to cause the lock-unit transmission 28 to move the first and second lock units 24, 26 between the first and second positions in response to the input. In other embodiments the actuator 22 may be engaged with one of the first or second lock-units 24, 26 to move the latch 20 between the first and second positions. In other embodiments, the actuator 22 may engage the first or second lock tabs In another example, the glove compartment 10 includes the glove box 12 and the latch system 14 as shown in FIGS. 1-3. The glove box 12 is adapted to be coupled to a vehicle in a fixed position relative to the vehicle. The latch system 114 is coupled to the glove box 12 and allows a user access to the glove box 12.

The glove box 12 includes the container 16 and the lid 18 as shown in FIGS. 1 and 2. The container 16 is formed to include an aperture arranged to open into a space formed in the container. The lid 18 is coupled to the container 16 and moves relative to the container 16 between a closed position as shown in FIGS. 1 and 4 and an open position as shown in FIGS. 2 and 5. The lid 18 is in the closed position when the lid closes the aperture and blocks access to the space. The lid 18 is in the open position when the lid has moved away from the container 16 to allow access to the space through the aperture.

The latch system 114 includes the latch 120 and the actuator 122 as shown in FIGS. 7-9. The latch 120 is coupled to the lid 18 and is configured to change the lid 18 from the closed position to the open position. The actuator 122 is coupled to the latch 120 and is configured to cause the latch 120 to change the lid 18 from the closed position to the open position in response to an input from a user.

The latch 120 includes first and second lock-units 124, 126, a lock-unit transmission 128, and a latch spring as shown in FIG. 7. The first lock-unit 124 unit is coupled to the container 16 to move relative to the container 16. The second lock-unit 126 unit is coupled to the container 16 to move relative to the container 16. The lock-unit transmission 128 is arranged to extend between and interconnect the first lock-unit 124 and the second lock-unit 126 to cause movement of the first lock-unit 124 to be transmitted to the second lock-unit 126. The first lock-unit 124 and the second lock-unit 126 move away from one another when the latch 120 is in the unlocked configuration and move toward one another when the latch 120 is in the locked configuration. The latch spring is arranged to extend between and interconnect the container 16 and the latch 120.

The actuator 122 includes a housing 132, a transmission mover 134, and a control system 36 as shown in FIGS. 7-9. The housing 132 is coupled to the container 16. The transmission mover 134 is coupled to the housing 132 and is engaged with the latch 120 to cause the latch 120 to move between the locked and unlocked configurations. The control system 36 is coupled to the transmission mover 134 and is configured to apply power to the transmission mover 134 to cause the transmission mover 134 to change the latch 120 between the locked and unlocked configurations along a lateral axis 138 of the housing 132 in response to receipt of the input to the control system 36.

The housing 132 includes a stationary housing foundation 156, a cover 158, and lock pins 160 as shown in FIGS. 7-9. The stationary housing foundation 156 is coupled to the container 16. The cover 158 is coupled to the stationary housing foundation 156 to define an interior space 164 between the stationary housing foundation 156 and the cover 158. The transmission mover 134 is arranged in part in the interior space 164 to move between a first mover position and a second mover position within the interior space 164. The lock pins 160 are oblong in shape and extend through the stationary foundation 156 to couple with transmission mover 134 for movement with the transmission mover 134 between the first mover and second mover positions relative to the axis 138. The lock pins 160 position the transmission mover 134 in the interior space 164 of the housing 132 and block movement of the transmission mover 134 out of the interior space 164.

The stationary housing foundation 156 includes peg holes 166 and pin holes 168 as shown in FIG. 9. The peg holes 166 extend through the stationary foundation 156 and are configured to receive a portion of the actuator arm 140. The pin holes 168 are arranged in spaced-apart relation to the peg holes 166 and are each configured to receive the lock pin 160 to secure the actuator arm 140 in the interior space 164 of the housing 132.

In the illustrative embodiment, the pin holes 168 are oblong in shape as shown in FIG. 9. The pin holes 168 are shaped to be larger than the lock pins 160 so that the lock pins 160 are slidable with the transmission mover 134 between the first and second mover positions along the axis 138 while blocking all other movement of the transmission mover 134 relative to the axis 138.

In the illustrative embodiment, the peg holes 166 are oblong in shape as shown in FIG. 9. In other embodiment, the holes 166 may be another suitable shape such as a rectangle.

The transmission mover 134 includes an actuator arm 140, a plurality of shape-memory alloy wires 142, and an actuator spring 144 as shown in FIGS. 8 and 9. The actuator arm 140 engages the latch 120. The plurality of shape-memory alloy wires 144 is coupled to the actuator arm 140. Each of the wires 142 are configured to move the actuator arm 140 along the lateral axis 138 in response to changes in length of the plurality of shape-memory alloy wires 142 between a first length and a relatively smaller second length in response to receipt of power supplied from the control system 36.

The first length of the wires 142 is associated with the locked configurations. The relatively smaller second length of the wires 142 is associated with the unlocked configuration.

The actuator arm 140 includes an actuator arm body 146, a first actuator arm peg 148, and a second actuator arm peg 150 as shown in FIGS. 8 and 9. The actuator arm body 146 is coupled to the stationary housing foundation 156 and slidable relative to the stationary housing foundation 156 within the interior space 164 along the lateral axis 138 of the stationary foundation 156. The first actuator arm peg 150 extends from the actuator arm body 146 outside of the interior space 164 the housing 132 to engage the latch 120. The second actuator arm peg 150 extends from the actuator arm body 146 opposite the first actuator arm peg 148 outside of the interior space 164 of the housing 36.

In the illustrative embodiment, the first and second actuator arm pegs 148, 150 extend out through the peg holes 166 of the stationary housing foundation 156. The first peg 148 extends out through the respective peg hole 166 and engages the actuator spring 144. The second peg 150 extends out through the respective peg hole 166 and engages a lock-unit transmission 128 of the latch 120.

In the illustrative embodiment, the first and second arm pegs 148, 150 are cylindrical in shape as shown in FIGS. 7 and 9. The peg holes 166 are shaped to be larger than the pegs 148, 150 so that the pegs 148, 150 may move between the first mover position and the second move position along the lateral axis 138.

The actuator arm 140 moves in a first direction along the lateral axis 138 from the first mover position to the second mover position when the plurality of shape-memory alloy wires change from the first length to the second length. The actuator spring 144 is arranged to extend between and interconnect the container 16 and the first actuator arm peg 148. The actuator spring 144 is configured to provide a first bias force to the first actuator arm peg 148 to urge the actuator arm 140 in a second direction opposite the first direction to cause the transmission mover 134 to move toward the first mover position.

In the illustrative embodiment, the actuator spring 144 may be a latch spring already included in the latch 120 of the glove box 12. The actuator spring 144 is arranged to extend between the latch system 114 and the container 16 and provide the first bias force to the latch 120 and the actuator 122 to return the latch 120 to the locked configuration and the actuator to the first mover position.

The lock pins 160 extend through the pin holes 168 of the housing 132 and into the actuator arm body 146 on either side of the actuator arm body 146. In the illustrative embodiment, the actuator arm body 146 is formed to include pin-receiver holes 154 that extend into the actuator arm body 146 on either side of the actuator arm body 146. The lock pins 160 extend into the pin-receiver holes 154 to couple the actuator arm body 146 to the housing 132 and to block movement of the actuator arm body 146 out of the interior space 164 of the housing 132.

The actuator arm body 146 includes a plurality of actuator attachment holes 152 and the stationary housing foundation 156 includes a plurality of housing attachment holes 162 as shown in FIG. 9. In the illustrative embodiment, each wire 142 of the plurality of shape-memory alloy wires 142 is looped through the plurality of actuator attachment holes 152 and the plurality of housing attachment holes 162 to form a figure-eight loop shape as shown in FIGS. 8 and 9.

The actuator arm body 146 includes at least three actuator attachment holes 152. In the illustrative embodiment, the actuator arm body 146 includes four attachment holes 152 and each individual wire 142 loops through its respective hole 152.

The stationary housing foundation 156 includes at least three housing attachment holes 162. In the illustrative embodiment, the foundation 156 includes four attachment holes 162 and each individual wire 142 loops through its respective hole 162.

In the illustrative embodiment, the plurality of shape-memory alloy wires 142 are looped through the respective actuator attachment holes 152 and housing attachment holes 162 such that each wire 144 is arranged in a figure eight shape as shown in FIG. 9. Each wire 144 of the plurality of shape-memory alloy wires 144 includes a first end 176 and a second end 178 as shown in FIG. 9. The first end 176 is coupled to the foundation 156 near the attachment holes 162 of the stationary housing foundation 156. The second end 178 is coupled to the actuator arm body 146 near the attachment holes 152 of the actuator arm body 146.

Each of the plurality of shape-memory alloy wires 144 include contact protection layers 194 and attachment couplings 196 as shown in FIG. 9. The contact protection layers are arranged around the respective wire 144 at a portion of the wire 144 that loops through the holes 152, 162 and contacts the housing 132 or the actuator arm 140. In the illustrative embodiment, the contact layers 194 are arranged around the wire 144 at the ends of the figure eight shape of the wires 144. Each attachment coupling 196 is arranged at each first and second end 176, 178 of the wire 144 and are configured to attached the wire 144 to the housing at the first end 176 and the actuator arm 140 at the second end 178. The attachment couplings 196 also provide an electrical attachment point for a power supply 82 of the control system 36.

The following numbered clauses include embodiments that are contemplated and non-limiting:

Clause 1. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 2. The glove compartment of clause 1, any other clause, or any combination of clauses, further comprising a latch including first lock unit coupled to the container to move relative to the container, a second lock unit coupled to the container to move relative to the container, and a lock-unit transmission arranged to extend between the interconnect the first lock unit and the second lock unit to cause movement of the first lock unit to be transmitted to the second lock unit.

Clause 3. The glove compartment of clause 2, any other clause, or any combination of clauses, wherein the first and second lock units are moveable between a first position in which movement of the lid relative to the container is blocked when the lid is in the closed position and a second position in which movement of the lid away from the container is permitted.

Clause 4. The glove compartment of clause 3, any other clause, or any combination of clauses, further comprising an actuator engaged with the lock-unit transmission and configured to cause the lock-unit transmission to move the first and second lock units between the first and second position in response to an input.

Clause 5. The glove compartment of clause 4, any other clause, or any combination of clauses, wherein the actuator includes a housing, a transmission mover coupled to the housing to move relative to the housing and engaged with the lock-unit transmission to cause the lock-unit transmission to move between the first position and the second position, and a control system coupled to the transmission mover and configured to apply power to the transmission mover to cause the transmission mover to change between a first mover position associated with the first position of the first and second lock units and a second mover position associated with the second position of the first and second lock units along a lateral axis of the housing in response to receipt of the input to the control system.

Clause 6. The glove compartment of clause 5, any other clause, or any combination of clauses, wherein the transmission mover includes an actuator arm coupled to the housing in a fixed position relative to the housing and arranged to extend toward the lock-unit transmission to engage the lock-unit transmission and a plurality of shape-memory alloy wires coupled to the actuator arm and configured to move the actuator arm along the lateral axis in response to changes in length of the plurality of shape-memory alloy wires between a first length associated with the first mover position and a relatively smaller second length associated with the second mover position in response to the receipt of power supplied from the control system.

Clause 7. The glove compartment of clause 6, any other clause, or any combination of clauses, wherein the actuator arm moves in a first direction along the lateral axis from the first mover position to the second mover position when the plurality of shape-memory alloy wires change from the first length to the second length.

Clause 8. The glove compartment of clause 7, any other clause, or any combination of clauses, wherein the transmission mover further includes an actuator spring arranged to extend between and interconnect the container and the actuator arm and configured to provide a first bias force to the actuator arm to urge the actuator arm in a second direction opposite the first direction to cause the transmission mover to move toward the first mover position.

Clause 9. The glove compartment of clause 8, any other clause, or any combination of clauses, wherein the housing includes a stationary housing foundation coupled to the container in a fixed position relative to the container and a movable cover coupled to the stationary housing foundation to define an interior space between the stationary housing foundation and the movable cover and movable relative to the stationary housing foundation along the lateral axis of the stationary foundation between a first housing position associated with the first mover position and a second housing position associated with the second mover position.

Clause 10. The glove compartment of clause 9, any other clause, or any combination of clauses, wherein the actuator arm extends from the moveable cover to engage the lock-unit transmission.

Clause 11. The glove compartment of clause 10, any other clause, or any combination of clauses, wherein the plurality of shape-memory alloy wires are coupled to the stationary housing foundation and the moveable cover within the interior space of the housing to cause the moveable cover to move in the first direction from the first housing position to the second housing position in response to the receipt of the input to the control system.

Clause 12. The glove compartment of clause 11, any other clause, or any combination of clauses, wherein the stationary housing foundation includes a first foundation end coupled to the container and the moveable cover includes a first cover end located in spaced-apart relation to the first foundation end of the stationary housing foundation along the lateral axis.

Clause 13. The glove compartment of clause 12, any other clause, or any combination of clauses, wherein each wire of the plurality of shape-memory alloy sires includes a first end coupled to the first foundation end of the stationary housing foundation and a second end coupled to the first cover end of the moveable cover.

Clause 14. The glove compartment of clause 11, any other clause, or any combination of clauses, wherein the moveable cover is formed to include a plurality of holes spaced apart from one another along a length of the movable cover relative to the lateral axis to allow air flow to the plurality of shape-memory alloy wires to cool the plurality of shape-memory alloy wires.

Clause 15. The glove compartment of clause 8, any other clause, or any combination of clauses, wherein the latch further includes a latch spring arranged to extend between and interconnect the container and the latch and configured to provide a second bias force to the latch to urge the latch in the second direction to cause the latch to move toward the first position.

Clause 16. The glove compartment of clause 6, any other clause, or any combination of clauses, wherein the housing includes a stationary housing foundation coupled to the container and a cover coupled to the stationary housing foundation to define an interior space between the stationary housing foundation and the cover.

Clause 17. The glove compartment of clause 16, any other clause, or any combination of clauses, wherein the transmission mover is arranged in part in the interior space to move between the first mover position and the second mover position within the interior space.

Clause 18. The glove compartment of clause 17, any other clause, or any combination of clauses, wherein the actuator arm includes an actuator arm body coupled to the stationary housing foundation and slidable relative to the stationary housing foundation within the interior space along the lateral axis of the stationary foundation, a first actuator arm peg that extends from the actuator arm body outside of the interior space of the housing to engage the latch, and a second actuator arm peg that extends from the actuator arm body opposite the first actuator arm peg outside of the interior space of the housing.

Clause 19. The glove compartment of clause 6, any other clause, or any combination of clauses, wherein the housing includes a stationary housing foundation coupled to the container in a fixed position relative to the container.

Clause 20. The glove compartment of clause 19, any other clause, or any combination of clauses, wherein the plurality of shape-memory allow wires are coupled to the stationary housing foundation and the actuator arm to move the transmission mover between the first mover position and the second mover position along the later axis.

Clause 21. The glove compartment of clause 20, any other clause, or any combination of clauses, wherein the plurality of shape-memory alloy wires includes at least three shape-memory alloy wires.

Clause 21. The glove compartment of clause 20, any other clause, or any combination of clauses, wherein the plurality of shape-memory allow wires includes four shape-memory allow wires.

Clause 22. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture.

Clause 23. The glove compartment of clause 22, any other clause, or any combination of clauses, further comprising a latch coupled to the container to change between a locked configuration in which movement of the lid from the closed position is blocked and an unlocked configuration in which movement of the lid from the closed position is permitted.

Clause 24. The glove compartment of clause 23, any other clause, or any combination of clauses, further comprising an actuator engaged with the latch to cause the latch to change between the locked and unlocked configurations in response to an input.

Clause 25. The glove compartment of clause 24, any other clause, or any combination of clauses, wherein the actuator includes a housing coupled to the container, a transmission mover coupled to the housing to move relative to the housing and engaged with the latch to cause the latch to move between the locked and unlocked configurations, and a control system coupled to the transmission mover and configured to apply power to the transmission mover to cause the transmission mover to change the latch between the locked and unlocked configurations along a lateral axis of the housing in response to receipt of the input to the control system.

Clause 26. The glove compartment of clause 25, any other clause, or any combination of clauses, wherein the transmission mover includes an actuator arm arranged to extend toward the latch and a plurality of shape-memory alloy wires coupled to the actuator arm and configured to move the actuator arm along the lateral axis in response to changes in length of the plurality of shape-memory alloy wires between a first length associated with the locked configurations and a relatively smaller second length associated with the unlocked configuration in response to receipt of power supplied from the control system.

Clause 27. The glove compartment of clause 26, any other clause, or any combination of clauses, wherein the housing includes a stationary housing foundation coupled to the container in a fixed position relative to the container and a cover coupled to the stationary housing foundation in a fixed position relative to the stationary housing foundation to define an interior space between the stationary housing foundation and the cover.

Clause 28. The glove compartment of clause 27, any other clause, or any combination of clauses, wherein the transmission mover is arranged in part in the interior space to move between a first mover position in which the latch is in the locked configuration and the second mover position in which the latch is in the unlocked configuration within the interior space.

Clause 29. The glove compartment of clause 28, any other clause, or any combination of clauses, wherein the actuator arm includes an actuator arm body, a first actuator arm peg that extends from the actuator arm body outside of the interior space of the housing to engage the latch, and a second actuator arm peg that extends from the actuator arm body opposite the first actuator arm peg outside of the interior space of the housing.

Clause 30. The glove compartment of clause 29, any other clause, or any combination of clauses, wherein the actuator arm moves in a first direction along the lateral axis from the first mover position to the second mover position when the plurality of shape-memory alloy wires change from the first length to the second length.

Clause 31. The glove compartment of clause 30, any other clause, or any combination of clauses, wherein the transmission mover further includes an actuator spring arranged to extend between and interconnect the container and the first actuator arm peg and configured to provide a first bias force to the first actuator arm peg to urge the actuator arm in a second direction opposite the first direction to cause the transmission mover to move toward the first mover position.

Clause 32. The glove compartment of clause 29, any other clause, or any combination of clauses, wherein the actuator arm body includes a plurality of actuator attachment holes and the stationary housing foundation includes a plurality of housing attachment holes.

Clause 33. The glove compartment of clause 32, any other clause, or any combination of clauses, wherein each wire of the plurality of shape-memory alloy wires is looped through the plurality of actuator attachment holes and the plurality of housing attachment holes to form a figure-eight loop shape.

Clause 34. The glove compartment of clause 26, any other clause, or any combination of clauses, wherein the housing includes a stationary housing foundation coupled to the container and a moveable cover coupled to the stationary housing foundation and slideable relative to the stationary housing foundation along the lateral axis of the stationary foundation between a first housing position associated with the first mover position and a second housing position associated with the second mover position.

Clause 35. The glove compartment of clause 34, any other clause, or any combination of clauses, wherein the actuator arm extends from the moveable cover to engage the lock-unit transmission and the plurality of shape-memory alloy wires are coupled to the stationary housing foundation and the moveable cover to cause the moveable cover to move in a first direction along the lateral axis from the first housing position to the second housing position in response to receipt of the input to the control system.

Clause 36. The glove compartment of clause 35, any other clause, or any combination of clauses, wherein the transmission mover further includes an actuator spring arranged to extend between and interconnect the container and the moveable cover and configured to provide a first bias force to the moveable cover to urge the moveable cover in a second direction opposite the first direction to cause the transmission mover to move toward the first mover position.

The invention claimed is:

1. A glove compartment comprising
a glove box adapted to be coupled to a vehicle in a fixed position relative to the vehicle, the glove box including a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch including first lock unit coupled to the container to move relative to the container, a second lock unit coupled to the container to move relative to the container, and a lock-unit transmission arranged to extend between and interconnect the first lock unit and the second lock unit to cause movement of the first lock unit to be transmitted to the second lock unit, the first and second lock units moveable between a first position in which movement of the lid relative to the container is blocked when the lid is in the closed position and a second position in which movement of the lid away from the container is permitted,
an actuator engaged with the lock-unit transmission and configured to cause the lock-unit transmission to move the first and second lock units between the first and second position in response to an input, the actuator including a housing, a transmission mover coupled to the housing to move relative to the housing and engaged with the lock-unit transmission to cause the lock-unit transmission to move between the first position and the second position, and a control system coupled to the transmission mover and configured to apply power to the transmission mover to cause the transmission mover to change between a first mover position associated with the first position of the first and second lock units and a second mover position associated with the second position of the first and second lock units along a lateral axis of the housing in response to receipt of the input to the control system,
wherein the transmission mover includes an actuator arm coupled to the housing in a fixed position relative to the housing and arranged to extend toward the lock-unit transmission to engage the lock-unit transmission and a plurality of shape-memory alloy wires coupled to the actuator arm and configured to move the actuator arm along the lateral axis in response to changes in length of the plurality of shape-memory alloy wires between a first length associated with the first mover position and a relatively smaller second length associated with the second mover position in response to the receipt of power supplied from the control system.

2. The glove compartment of claim 1, wherein the actuator arm moves in a first direction along the lateral axis from the first mover position to the second mover position when the plurality of shape-memory alloy wires change from the first length to the second length, and wherein the transmission mover further includes an actuator spring arranged to extend between and interconnect the container and the actuator arm and configured to provide a first bias force to the actuator arm to urge the actuator arm in a second direction opposite the first direction to cause the transmission mover to move toward the first mover position.

3. The glove compartment of claim 2, wherein the housing includes a stationary housing foundation coupled to the container in a fixed position relative to the container and a movable cover coupled to the stationary housing foundation to define an interior space between the stationary housing foundation and the movable cover and movable relative to the stationary housing foundation along the lateral axis of the stationary foundation between a first housing position associated with the first mover position and a second housing position associated with the second mover position.

4. The glove compartment of claim 3, wherein the actuator arm extends from the moveable cover to engage the lock-unit transmission, and wherein the plurality of shape-memory alloy wires are coupled to the stationary housing foundation and the moveable cover within the interior space of the housing to cause the moveable cover to move in the first direction from the first housing position to the second housing position in response to the receipt of the input to the control system.

5. The glove compartment of claim 4, wherein the stationary housing foundation includes a first foundation end coupled to the container and the moveable cover includes a first cover end located in spaced-apart relation to the first foundation end of the stationary housing foundation along the lateral axis, and wherein each wire of the plurality of shape-memory alloy sires includes a first end coupled to the first foundation end of the stationary housing foundation and a second end coupled to the first cover end of the moveable cover.

6. The glove compartment of claim 4, wherein the moveable cover is formed to include a plurality of holes spaced apart from one another along a length of the movable cover relative to the lateral axis to allow air flow to the plurality of shape-memory alloy wires to cool the plurality of shape-memory alloy wires.

7. The glove compartment of claim 2, wherein the latch further includes a latch spring arranged to extend between and interconnect the container and the latch and configured to provide a second bias force to the latch to urge the latch in the second direction to cause the latch to move toward the first position.

8. The glove compartment of claim 1, wherein the housing includes a stationary housing foundation coupled to the container and a cover coupled to the stationary housing foundation to define an interior space between the stationary housing foundation and the cover, and wherein the transmission mover is arranged in part in the interior space to move between the first mover position and the second mover position within the interior space.

9. The glove compartment of claim 8, wherein the actuator arm includes an actuator arm body coupled to the stationary housing foundation and slidable relative to the stationary housing foundation within the interior space along the lateral axis of the stationary foundation, a first actuator arm peg that extends from the actuator arm body outside of the interior space of the housing to engage the latch, and a second actuator arm peg that extends from the actuator arm body opposite the first actuator arm peg outside of the interior space of the housing.

10. The glove compartment of claim 1, wherein the housing includes a stationary housing foundation coupled to the container in a fixed position relative to the container, and wherein the plurality of shape-memory allow wires are coupled to the stationary housing foundation and the actuator arm to move the transmission mover between the first mover position and the second mover position along the later axis.

11. The glove compartment of claim 10, wherein plurality of shape-memory alloy wires includes at least three shape-memory alloy wires.

12. The glove compartment of claim 10, wherein the plurality of shape-memory allow wires includes four shape-memory allow wires.

13. A glove compartment comprising
a glove box adapted to be coupled to a vehicle in a fixed position relative to the vehicle, the glove box including
a container formed to include an aperture arranged to open into a space formed in the container and a lid coupled to the container to move relative to the container between a closed position in which the lid closes the aperture and blocks access to the space and an opened position in which the lid has moved away from the container to allow access to the space through the aperture,
a latch coupled to the container to change between a locked configuration in which movement of the lid from the closed position is blocked and an unlocked configuration in which movement of the lid from the closed position is permitted, and
an actuator engaged with the latch to cause the latch to change between the locked and unlocked configurations in response to an input, the actuator including a housing coupled to the container, a transmission mover coupled to the housing to move relative to the housing and engaged with the latch to cause the latch to move between the locked and unlocked configurations, and a control system coupled to the transmission mover and configured to apply power to the transmission mover to cause the transmission mover to change the latch between the locked and unlocked configurations along a lateral axis of the housing in response to receipt of the input to the control system,
wherein the transmission mover includes an actuator arm arranged to extend toward the latch and at least one shape-memory alloy wire coupled to the actuator arm and configured to move the actuator arm along the lateral axis in response to changes in length of the at least one shape-memory alloy wire between a first length associated with the locked configuration and a relatively smaller second length associated with the unlocked configuration in response to receipt of power supplied from the control system;
wherein the housing includes a stationary housing foundation coupled to the container in a fixed position relative to the container and a cover coupled to the stationary housing foundation in a fixed position relative to the stationary housing foundation to define an interior space between the stationary housing foundation and the cover and wherein the transmission mover is arranged in part in the interior space to move between a first mover position in which the latch is in the locked configuration and the second mover position in which the latch is in the unlocked configuration within the interior space.

14. The glove compartment of claim 13, wherein the actuator arm includes an actuator arm body, a first actuator arm peg that extends from the actuator arm body outside of the interior space of the housing to engage the latch, and a second actuator arm peg that extends from the actuator arm body opposite the first actuator arm peg outside of the interior space of the housing.

15. The glove compartment of claim 14, wherein the actuator arm moves in a first direction along the lateral axis from the first mover position to the second mover position when the at least one shape-memory alloy wire changes from the first length to the second length, and wherein the transmission mover further includes an actuator spring arranged to extend between and interconnect the container and the first actuator arm peg and configured to provide a first bias force to the first actuator arm peg to urge the actuator arm in a second direction opposite the first direction to cause the transmission mover to move toward the first mover position.

16. The glove compartment of claim 14, wherein the at least one shape-memory alloy wire includes a plurality of shape-memory wires and the actuator arm body includes a plurality of actuator attachment holes and the stationary housing foundation includes a plurality of housing attachment holes, and wherein each wire of the plurality of shape-memory alloy wires is looped through the plurality of actuator attachment holes and the plurality of housing attachment holes to form a figure-eight loop shape.

17. The glove compartment of claim 13, wherein the housing includes a stationary housing foundation coupled to the container and a moveable cover coupled to the stationary housing foundation and slideable relative to the stationary housing foundation along the lateral axis of the stationary foundation between a first housing position associated with the first mover position and a second housing position associated with the second mover position.

18. The glove compartment of claim 17, wherein the actuator arm extends from the moveable cover to engage the lock-unit transmission and the at least one shape-memory wire is coupled to the stationary housing foundation and the moveable cover to cause the moveable cover to move in a first direction along the lateral axis from the first housing position to the second housing position in response to receipt of the input to the control system.

19. The glove compartment of claim 18, wherein the transmission mover further includes an actuator spring arranged to extend between and interconnect the container and the moveable cover and configured to provide a first bias force to the moveable cover to urge the moveable cover in a second direction opposite the first direction to cause the transmission mover to move toward the first mover position.

* * * * *